(12) United States Patent
Giaquinto

(10) Patent No.: US 11,191,379 B2
(45) Date of Patent: Dec. 7, 2021

(54) DEVICE FOR SECURING UTENSILS TO SERVEWARE

(71) Applicant: Wares World Wide LLC, Trenton, NJ (US)

(72) Inventor: Giuseppina Giaquinto, Trenton, NJ (US)

(73) Assignee: Wares World Wide LLC

( * ) Notice: Subject to any disclaimer, the term of this patent is extended or adjusted under 35 U.S.C. 154(b) by 0 days.

(21) Appl. No.: 16/090,426

(22) PCT Filed: Jun. 8, 2017

(86) PCT No.: PCT/US2017/036551
§ 371 (c)(1),
(2) Date: Oct. 1, 2018

(87) PCT Pub. No.: WO2017/218289
PCT Pub. Date: Dec. 21, 2017

(65) Prior Publication Data
US 2019/0110621 A1    Apr. 18, 2019

Related U.S. Application Data

(60) Provisional application No. 62/349,392, filed on Jun. 13, 2016.

(51) Int. Cl.
*A47G 21/14*    (2006.01)
*A47J 43/28*    (2006.01)

(52) U.S. Cl.
CPC .......... *A47G 21/145* (2013.01); *A47J 43/287* (2013.01)

(58) Field of Classification Search
CPC .... A47G 21/14; A47G 21/145; A47G 29/087; A47J 45/02; A47J 43/287
(Continued)

(56) References Cited

U.S. PATENT DOCUMENTS 1,300,008 A    4/1919  Plasclascovitie
1,393,574 A *  10/1921 Rohmiller ............ A47G 21/145
                                                              220/735
(Continued)

FOREIGN PATENT DOCUMENTS

DE       630170 C  *  8/1936  ........... A47G 21/145
FR    2805725 A1  *  9/2001  ........... A47G 21/145
(Continued)

OTHER PUBLICATIONS

International Search Report issued in counterpart International Application PCT/US2017/036551 (dated Aug. 11, 2017).

*Primary Examiner* — Jonathan Liu
*Assistant Examiner* — Guang H Guan
(74) *Attorney, Agent, or Firm* — Rivkin Radler, LLP

(57) ABSTRACT

A utensil retaining device includes a body portion having a longitudinal wall extending between a first end and a second end such that a utensil entrance is defined therebetween and an extension member connected to the body portion. The extension member contains a plurality of flexible cables therewithin such that it can be easily flexibly adapted to removably attach to various contours of upper edges and exterior surfaces of serveware. The utensil retaining device is made of a heat resistant and flexible moldable polymeric material such that the body portion moldably and flexibly grips the exterior surface of the handle of a utensil, serving utensil, tool instrument or other handheld tools.

19 Claims, 9 Drawing Sheets

(58) Field of Classification Search
USPC ...... 248/37.3, 37.6, 213.2; 211/70.7; 30/327
See application file for complete search history.

(56) References Cited

U.S. PATENT DOCUMENTS

| | | | | |
|---|---|---|---|---|
| 1,687,795 | A | | 10/1928 | Ritter |
| 2,146,190 | A | * | 2/1939 | Luke ...................... B65D 45/18 24/482 |
| 2,243,554 | A | * | 5/1941 | Epstein ................... H04M 1/05 379/449 |
| 2,274,219 | A | | 2/1942 | Seller |
| 2,404,473 | A | * | 7/1946 | Chunn ...................... F16L 3/12 248/74.3 |
| 2,590,286 | A | * | 3/1952 | Wirtanen ............. A47G 21/145 248/37.6 |
| 2,713,469 | A | | 7/1955 | Wright |
| 2,906,124 | A | * | 9/1959 | Chaney ................... G01K 1/14 374/194 |
| 2,907,539 | A | * | 10/1959 | Vardan ................. A61J 9/0638 248/104 |
| 3,149,824 | A | | 9/1964 | Albano |
| 3,683,462 | A | * | 8/1972 | Voigt ..................... A63C 11/021 24/564 |
| 4,007,527 | A | | 2/1977 | Tibbs |
| 4,121,798 | A | | 10/1978 | Schumacher et al. |
| 4,193,572 | A | * | 3/1980 | Horiuchi ................ F16M 13/00 248/229.26 |
| 4,940,199 | A | | 7/1990 | Hall |
| 5,105,963 | A | | 4/1992 | Scott |
| 5,542,636 | A | | 8/1996 | Mann et al. |
| D375,453 | S | * | 11/1996 | Fleck .................... F41C 33/007 D8/395 |
| 5,794,898 | A | * | 8/1998 | Bradley ................ A61J 9/0638 248/102 |
| 5,853,157 | A | | 12/1998 | O'Donnell |
| 6,580,662 | B2 | * | 6/2003 | Vassallo .................. A47J 36/32 368/10 |
| 8,020,825 | B2 | * | 9/2011 | Dostaler ............ A47G 23/0225 24/332 |
| 8,091,845 | B2 | * | 1/2012 | Di Lollo ................ A47J 47/16 248/213.2 |
| 8,424,825 | B2 | * | 4/2013 | Somuah ............. B60R 11/0235 248/130 |
| 8,545,041 | B2 | * | 10/2013 | Brown ..................... A42B 1/24 24/336 |
| D696,904 | S | | 1/2014 | Swierski et al. |
| 8,777,170 | B2 | * | 7/2014 | Gilbert ..................... A63H 3/50 224/666 |
| 8,839,546 | B2 | * | 9/2014 | Taylor .................. F41C 33/007 42/85 |
| 9,408,499 | B2 | * | 8/2016 | Jacoby .................. A47J 43/287 |
| 9,609,968 | B2 | * | 4/2017 | Garrels .................. A47G 21/04 |
| 9,980,612 | B2 | * | 5/2018 | Neumann ............... A47J 45/02 |
| 2009/0229130 | A1 | | 9/2009 | Swierski et al. |
| 2019/0110621 | A1 | * | 4/2019 | Giaquinto ............ A47G 21/145 |

FOREIGN PATENT DOCUMENTS

| | | |
|---|---|---|
| GB | 433607 | 8/1935 |
| WO | WO2013104780 A1 | 7/2013 |

\* cited by examiner

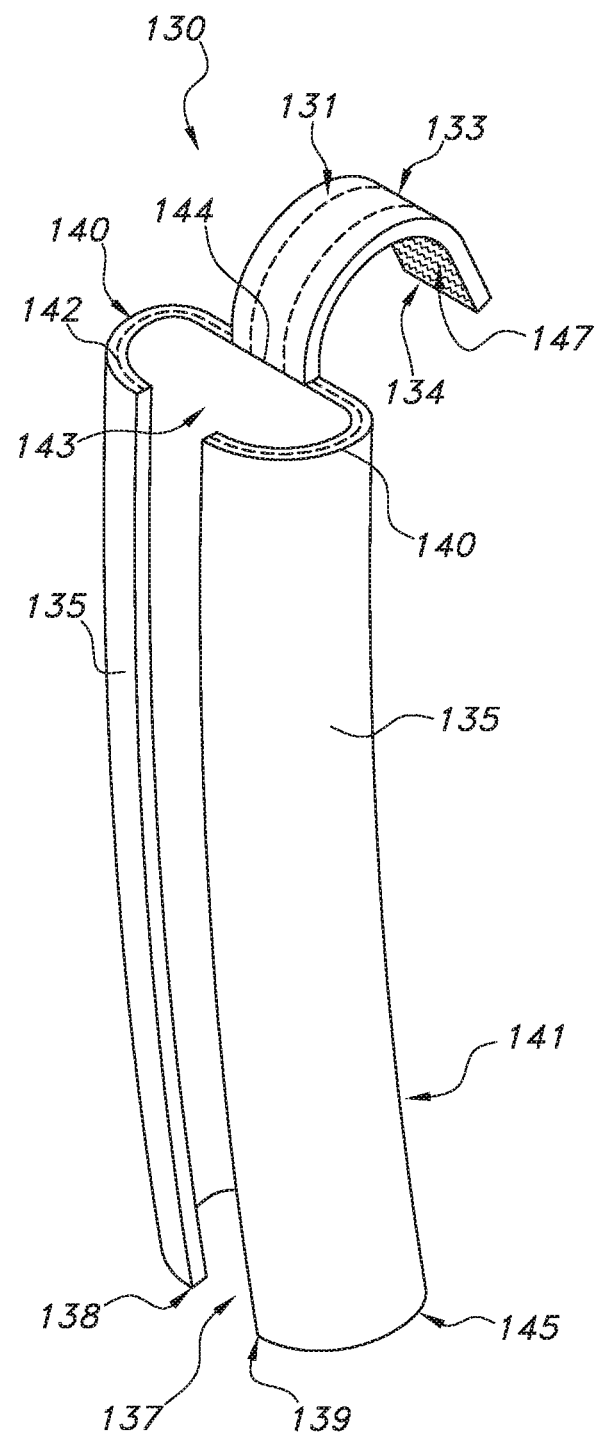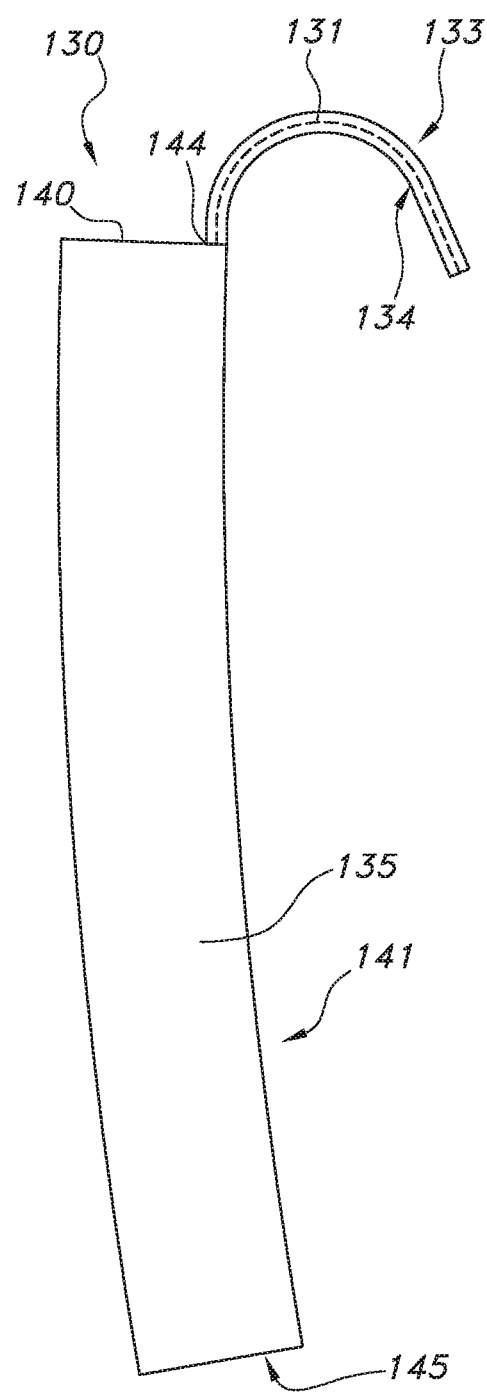
FIG. 13
FIG. 14

DEVICE FOR SECURING UTENSILS TO SERVEWARE

CROSS-REFERENCE TO RELATED APPLICATION(S)

This application is the U.S. National Phase of International Patent Application No. PCT/US2017/036551, filed on Jun. 8, 2017, which claims the benefit of U.S. Provisional Application No. 62/349,392, filed on Jun. 13, 2016, the specifications of which are incorporated by reference herein in their entirety for all purposes.

FIELD OF THE DISCLOSURE

The present disclosure relates to a heat-resistant and flexible device for securing utensils, including serving utensil to serveware, dishes, pots, pans, other containers or holders, which is used to effectively secure the utensil to prevent it from descending into the serveware, pot, pan, dish or food container it is secured to, thereby preventing contamination of the contents with any foreign contaminants on the surface of the utensil and/or prevent any spillage of the contents on the utensil handle including any residual heating of the handle to prevent burning of the skin of a user.

BACKGROUND

The most commonly used utensils and serving utensils are made of metal materials which are known to conduct heat when in contact with another item that is above normal temperatures or high temperatures, such as a hot pot, pan, or foods. In addition, most utensils and serving utensils do not include a holder that prevents the utensil from being submerged in the contents of the serveware, tray, dish, pot and/or pan that the utensil is being utilized in connection with food preparation and serving thereof.

There is also the problem with generally preventing contamination of food during preparation thereof or while serving the food. There is generally no known heat-resistant utensil device that is easily affixed to serveware to either prevent the utensil from sliding into the food contents and/or contaminate the food with the utensil handle that has been in contact with one or more human hands during food preparation and/or serving of prepared food items.

Certain known holders for spoons and the like such as disclosed in U.S. Pat. No. 2,274,219, that are non-flexible and pre-formed in design, with a side upper portion tapering to a narrow lower portion, do not provide for the flexibility of design nor the utility as provided in the embodiments of the disclosed device. Nor does such holder provide for a heat-resistant and flexibly moldable device that adapts to the shape and size of any utensil or serving utensil and further to the shape and size of the serveware, pot, pan or food container it is affixed to.

Thus, there is a need for a new and improved utensil retaining device that prevents the utensil from slippage or dipping the handle portion thereof, into the contents of a cooking receptacle, such as a pot, pan, or other cooking vessel. More particularly, there is a need for a utensil retaining device adapted to be flexibly affixed to the handle of a utensil, serving utensil or cooking utensil such as a ladle or spoon, such that the utensil remains in the cooking vessel when not in use, thereby preventing spillage of the utensil into the cooking receptacle while simultaneously preventing the handle of the utensil from becoming overheated. The utensil device can act as a sleeve adapted to engage a portion or the full extension of the utensil handle, while absorbing excessive heat as the sleeve is comprised of heat resistant materials.

It is often necessary while cooking to periodically stir the food contents while being cooked. It would be desirable for the cook to be able to leave the cooking receptacle unattended permitting the cooking utensil to be securely affixed to the outer perimeter. It would be further desirable to prevent the cook from having to move the utensil or to place it on the stove top or adjacent countertop since it generally will drip or leave a trail of residue of the hot food contents being cooked and potentially inadvertently burn someone located nearby. In addition, it is quite possible that foreign substances will be transferred into the food.

Therefore, it is an object of the present disclosure to provide a holder with an extension member at one end thereof which is adapted to secure onto cooking serveware or a cooking receptacle while securing the utensil within the holder ring portion which may include, in certain embodiments, a slot opening. The holding ring portion in certain embodiments also adapts in size to the circumference or size of the utensil being secured.

Another object of the invention is to provide a simple handle retaining device of the type described herein and in which said handle portion is adapted to remain either on the handle during use to absorb excessive heat on the handle of the utensil as a result of the property of conduction of heat in a metal utensil and/or to separate the device from the vessel during such use in accordance with the preference of the user.

A still further object of the invention is to provide a handle engaging device which maintains an association with the cooking vessel whereby it will be readily removable therefrom, yet which device will still be capable of keeping the utensil from submerging into the food and function to absorb the heat conducted about the handle portion while retaining the utensil.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The present disclosure provides for a utensil retaining device comprising a body portion having a curved wall extending between a first end and a second end such that a utensil entrance is defined therebetween; and an extension member connected to the body portion including at least one flexible wire therewithin such that it is adapted to attach to a contour of an upper edge and exterior surface of a vessel. In yet a further embodiment, the utensil retaining device utensil includes a body portion that moldably and flexibly grips the circumference of the handle of a utensil, serving utensil, tool instrument or other tools. In yet a further disclosed embodiment, the utensil retaining device includes a top edge portion of the curved wall that is integral at its center with the curved extension member. In yet a further disclosed embodiment, the utensil retaining device includes an extension member comprising a flexible member, which extends outwardly from the body portion. In yet a further disclosed embodiment, the utensil retaining device includes an extension member that is integrally formed with the body portion. In yet a further disclosed embodiment, the height of the curved wall of the body portion of the utensil retaining device is designed and dimensioned such that a large portion of the handle of a utensil can be moldably and flexibly gripped. In yet a further disclosed embodiment, the utensil retaining device is made of heat resistant material such as polymers having specific heat capacities or other flexible moldable polymeric materials. In yet a further disclosed embodiment, the polymeric materials include silicone, polyurethane, polyethylene, polystyrene, polyolefin, polyacrylate, polyester, polyamide, polysulfone based polymers, and combinations thereof. In yet a further disclosed embodiment, the utensil retaining device is coated with a material that has a specific heat capacity of greater than a stainless steel utensil. In yet a further disclosed embodiment, the utensil retaining device comprises an extension member including an underside portion that has a ridged surface.

The present disclosure further provides for a utensil retaining device comprising a body portion having a curved longitudinal wall, the curved longitudinal wall extending between a first and second open end, such that a utensil retaining volume is defined therebetween; and an extension member connected to the body portion, wherein the extension member includes one or more flexible wires therewithin, such that the extension member is adapted to affix to a contour of an upper edge and exterior surface of a vessel. In yet a further disclosed embodiment, the utensil retaining device includes that the body portion moldably and flexibly grip the circumference of the handle of a utensil, serving utensil, tool instrument or other tools. In yet a further disclosed embodiment, the utensil retaining device includes a top edge portion of the curved longitudinal wall that is integral at its center with the extension member. In yet a further disclosed embodiment, the utensil retaining device includes an extension member that is a curved member, which extends outwardly from the body portion. In yet a further disclosed embodiment, the utensil retaining device includes that the extension member is integrally formed with the body portion. In yet a further disclosed embodiment, the utensil retaining device comprises heat resistant material including polymers having specific heat capacities or other flexible moldable polymeric materials. In yet a further disclosed embodiment, the polymeric materials include one or more of silicone, polyurethane, polyethylene, polystyrene, polyolefin, polyacrylate, polyester, polyamide, polysulfone based polymers, and combinations thereof. In yet a further disclosed embodiment, the utensil retaining device is coated with a material that has a specific heat capacity of greater than a stainless steel utensil. In yet a further disclosed embodiment, the utensil retaining device comprises a curved extension member that includes an underside portion that has a ridged surface. In yet a further disclosed embodiment, the body portion of the utensil retaining device further includes one or more filaments or wires for molding the device to any shaped or sized contour of a rim of the vessel.

The present disclosure further provides for a utensil retaining device comprising a body portion having a circular band portion that is made of flexible material, the band portion defining a utensil retaining volume therebetween for securing the utensil within the utensil retaining volume; and an extension member integrally connected to the body portion including at least one flexible wire therewithin, the extension member being adapted to attach to a contour of an upper edge and exterior surface of a vessel.

Other features of the present disclosure will become apparent from the following detailed description considered in conjunction with the accompanying drawings. It is to be understood, however, that the drawings are designed as an illustration only and not as a definition of the limits of the claims or the disclosure.

BRIEF DESCRIPTION OF THE DRAWINGS

FIG. 13 is a perspective view of a utensil holder device that secures a larger portion of the handle of the utensil, in accordance with an embodiment of the present disclosure;

FIG. 14 is a side view of the utensil securing device shown in FIG. 13, in accordance with an embodiment of the present disclosure.

Figure 1:
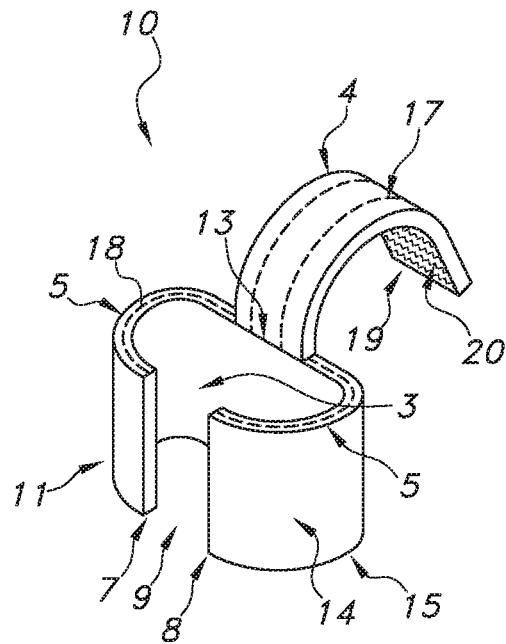
FIG. 1 is a top perspective view of a utensil holder device in accordance with an embodiment of the present disclosure.

It is to be appreciated that elements in the Figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

The following sections describe exemplary embodiments of the present disclosure. It should be apparent to those skilled in the art that the described embodiments of the present disclosure provided herein are illustrative only and not limiting, having been presented by way of example only.

All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto.

Throughout the description, where items are described as having, including, or comprising one or more specific components, or where processes and methods are described as having, including, or comprising one or more specific steps, it is contemplated that, additionally, there are items of the present disclosure that consist essentially of, or consist of, the one or more recited components, and that there are processes and methods according to the present disclosure that consist essentially of, or consist of, the one or more recited processing steps.

As shown in the drawings for purposes of illustration are various embodiments of the disclosed device for securing utensils, serving utensils, instruments and/or other tools to a vessel, cookware, serveware, food holder, receptacle for food and/or other materials.

According to an embodiment of the present disclosure, shown in FIG. 1 is a top perspective view of the utensil holder device 10 including a main U-shaped body portion 11 that comprises a flexibly moldable circular band portion 14 that has a first end 7 and second end 8 with open space or slot 9 therebetween, such as a u-shape. The main body portion 11 is integral to and extends from the top middle portion 13 of the main body 11 and supports the extension hook portion 4. The extension hook portion may be an integral extension member, an extension member, a curved extension member, a curvi-linear shaped extension member and/or a linear extension portion of the device 10. The band portion 14 is moldable and flexibly grips the circumference of the handle portion of a utensil, serving utensil, tool instrument or other tools. The extension hook 4 is configurable to mold and engage with a serveware, tray, pot or other vessel, and can also simultaneously secure a utensil within the retaining space 3 of the device 10. The top edge portion 5 of the band portion 14 is integral from its center 13 with the extension hook portion 4 and supports the extension hook portion 4 from center 13. In certain embodiments, the body portion 11 may be defined by a semi-circular wall that extends longitudinally between the top edge 5 and bottom edge 15 of the main body 11. In certain embodiments, a utensil retaining volume 3 is adaptable to mold and flexibly grip the circumference or perimeter of a utensil 40, serving utensil, tool, instrument, or other type of instrument or tool including medical instruments (as is illustrated and further described in connection with FIGS. 4-7).

The slot or space 9 shown between ends 7 and 8, is a particular size in its natural non-extended state and is configurable to be expanded. In alternative embodiments, the band portion 11 may include one or more wire filaments or thin bendable wires 18 internal to the center of the band portion such that the band portion 11 may be molded to diminish the size of the slot 9 as shown in FIG. 1, for gripping or retaining smaller sized utensils 40, for example having smaller sized circumferences or thinner and/or flatter shaped handle portion(s) 45, as shown for example in FIG. 4. Alternatively, the band portion 11 may be enlarged from its natural non-extended state by flexible expansion of the u-shaped band portion 14, which in turn expands the utensil receiving space 3, to grip or hold utensil or tool 41 handles 45 having larger sized circumferences. The one or more flat or thin wire filaments or other types of thin bendable wires 18 internal to the center of the band portion 14, permit(s) the main body portion 11 to be moldable and expandable to adapt to the size of the slot 9, as shown in FIG. 1, and for securing a larger sized utensil 40 or tool, therebetween. The bottom edge portion 15 is longitudinal relative to the top edge portion 5 of the main body portion 11, thereby defining a utensil entrance and space 3 for retaining the utensil therebetween.

Figure 4:
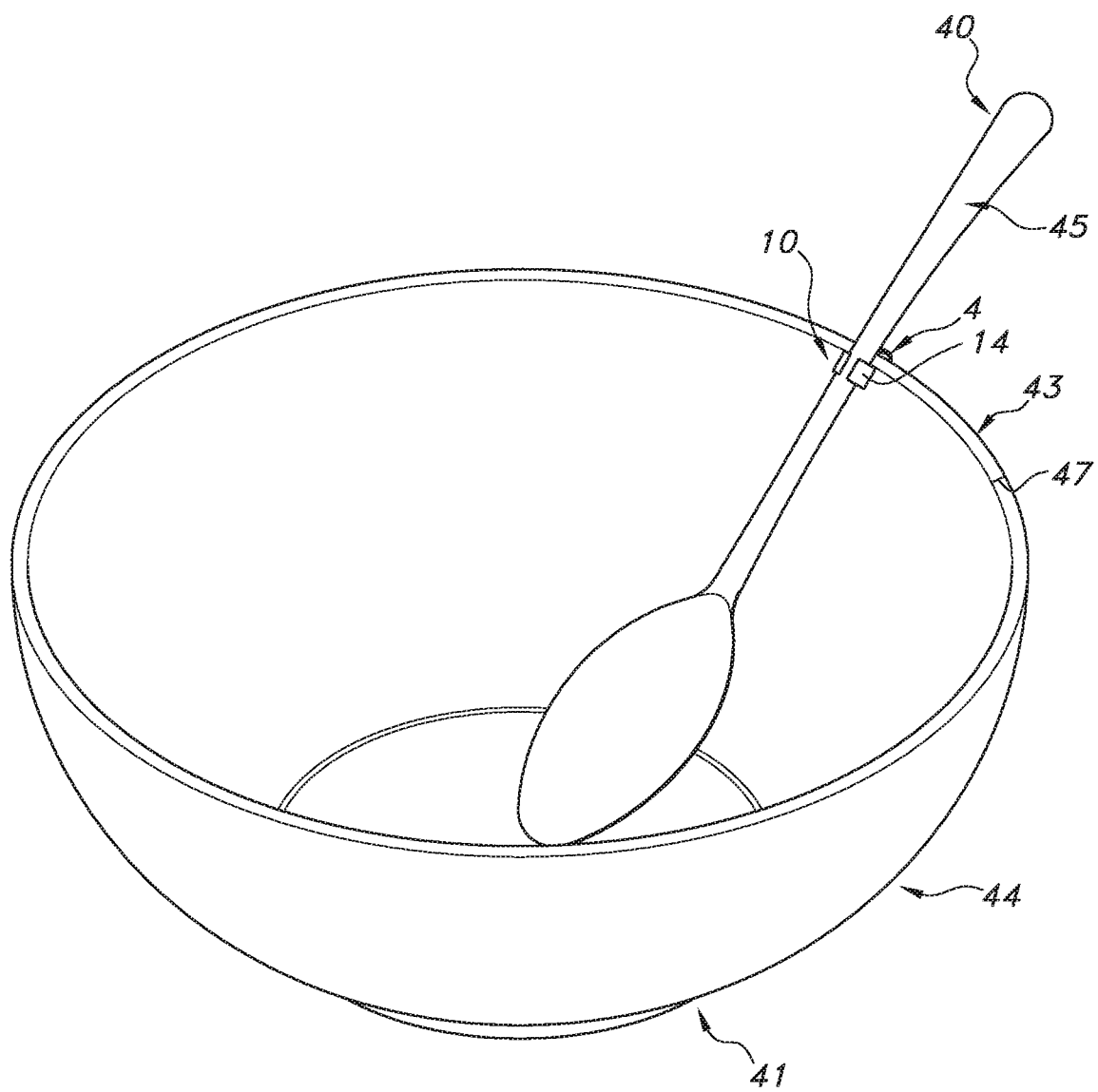
FIG. 4 is a top perspective view of a utensil affixed to serveware in accordance with an embodiment of the utensil holder device as shown in FIG. 1.
Figure 5:
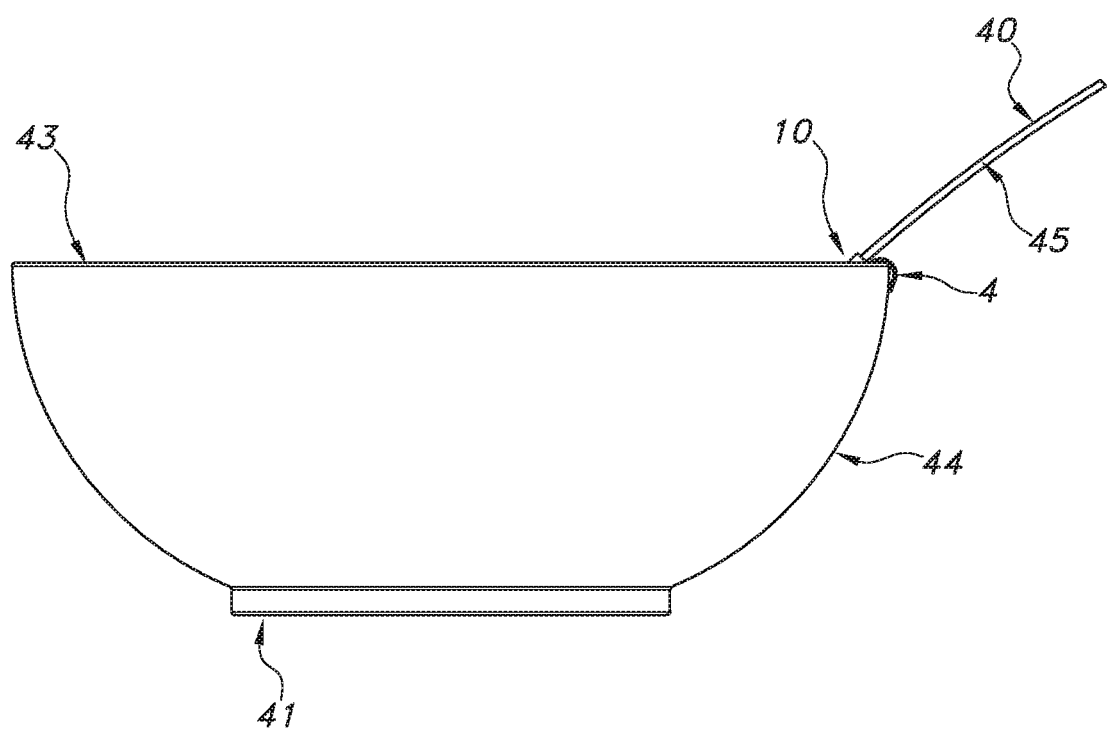
FIG. 5 is a side view of the utensil handle and partial view of the utensil holder device as shown in FIG. 4, as affixed to serveware in accordance with an embodiment of the present disclosure.
Figure 6:
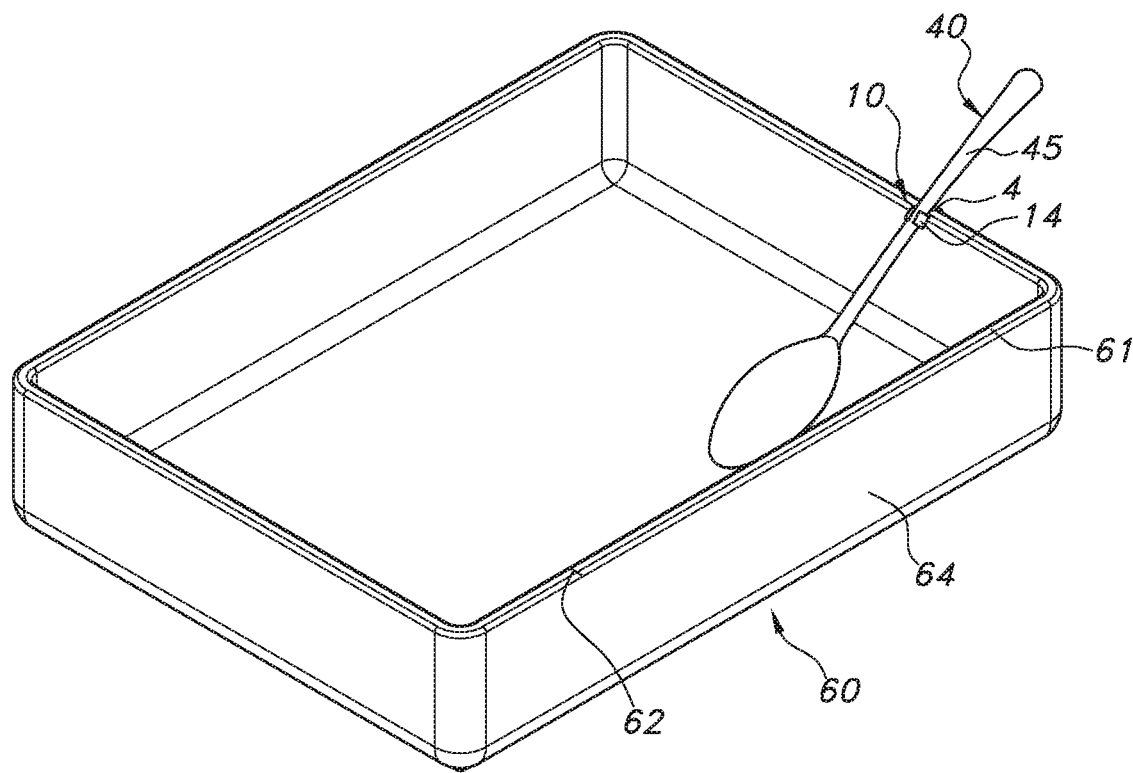
FIG. 6 is a top perspective view of the utensil holder device securing a utensil to serving ware.
Figure 7:
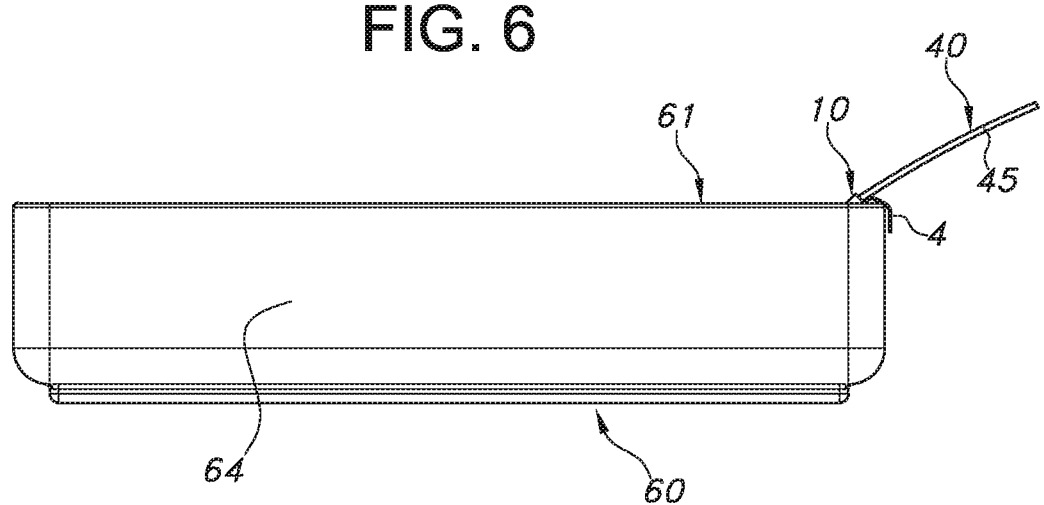
FIG. 7 is a side view of the utensil holder device secured to serveware and further securing a utensil to the serving ware as shown in FIG. 6 in accordance with an embodiment of the present disclosure.

In certain embodiments, the extension hook 4 is a curved member, which extends outwardly from the body portion 11 from center 13. The extension hook 4 comprises a plurality of flexible filaments or thin flexible wires shown as dotted lines 17 such that the hook portion 4 is easily adaptable to be securely affixed to and/or removably attached to various shaped contours of upper edges 43 of various shaped serveware, and further adaptable to the contours of exterior surfaces 44 of various shaped serveware 40, or other vessels, such as a bowl 41 (as shown in FIGS. 4 and 5) and a vessel or tray for food or other material (as shown in FIGS. 6 and 7). In the shop shown embodiment, the extension hook 4 is integrally formed and extends from the body portion 11.

In certain embodiments, shown in the underside 19 of the extension hook 4 are ridges 20 along the surface of the underside 19 that function to increase the gripping surface and therefore permitting the device 10 to be more securely affixed to the serveware without risk of slippage therefrom. In certain embodiments, in order to improve the grip between the device and the surface of the serveware the device is affixed to, a modification in the surface on the underside 19 of the hook portion 4 is introduced, usually in the shape of ridges 19 or similar introduction of less smooth surface including other shaped indentations. However, there is a variability in the characteristics of these ridges, with heights varying between for example, 0.1 and 5 mm, widths between 0.1 and 9.5 mm, and spacing between 0.2 and 5.5 mm. The characteristics of these textures are usually based on variable design in order to increase the performance of the device 10 and prevent slippage of the device 10 from the serveware by increasing the friction therebetween, including the exterior surfaces of serveware and the gripping surface of the device 10.

In an alternate embodiment, the extension hook portion 4 is connected to and removably attached to the body portion 11 of the device 10, via some other connective material such as for example, Velcro®, glue or other heat-resistant fastener or fastener member. In yet another embodiment, the extension hook portion 4 is affixed to the exterior surfaces 44 of the serveware 41 or other vessel or tray, via a fastener such as for example, Velcro®, glue. In yet another embodiment, the extension hook portion 4 is permanently affixed to the exterior surfaces 44 of the serveware 41 or other vessel or tray, via a permanent fastener secured to the outer surface 44 of the serving bowl 41 or tray 60.

In a preferred embodiment, the utensil hook device 10 is comprised of heat resistant material such as polymers having specific heat capacities or other flexible moldable polymeric material. Examples of suitable polymeric materials that are flexible and moldable include silicone, polyurethane, polyethylene, polystyrene, polyolefin, polyacrylate, polyester, polyamide, polysulfone based polymers, and combinations thereof. Examples of polymers having their specific heat capacities are polytetrafluoroethylene (PTFE) with a specific heat capacity of 970 $J \cdot kg^{-1} \cdot K^{-1}$; polyethylene has a specific heat capacity of 1550 $J \cdot kg^{-1} \cdot K^{-1}$; and polystyrene with a specific heat capacity of 1110 $J \cdot kg^{-1} \cdot K^{-1}$. The polymers may further contain additive to confer desirable qualities such as flexibility, moldability, heat resistance, and color. Such additives are known in the art.

In yet another embodiment, the utensil retaining device 10 may be coated with a material that has a specific heat capacity of greater than the utensil itself, for example, a stainless steel utensil. For example, the utensil may have a heat capacity of for example, greater than 500 $J\cdot kg^{-1}\cdot K^{-1}$ (the capacity of stainless steel), greater than 750 $J\cdot kg^{-1}\cdot K^{-1}$, or even greater than 1000 $J\cdot kg^{-1}\cdot K^{-1}$.

In one embodiment, the utensil is made of and/or is coated with stainless steel, and has an approximate specific heat capacity of 500 $J\cdot kg^{-1}\cdot K^{-1}$ Therefore, the device 10 in such embodiment, would have a specific heat capacity of greater than 500 $J\cdot kg^{-1}\cdot K^{-1}$. An example of material that has a specific heat capacity of greater than 500 $J\cdot kg^{-1}\cdot K^{-1}$, includes silicone rubber (generally having a specific heat capacity of between 1300-1500 $J\cdot kg^{-1}\cdot K^{-1}$). In a preferred embodiment, the device 10 generally has a specific heat capacity that is greater than the utensil so that it is heat resistant when for example, a utensil or tool is being secured to the device 10 and the utensil or tool is made of aluminum (including alloys of aluminum), stainless steel, silver and other less common materials.

It is noted that the device 10 is flexible and moldable at room temperature. The polymers that constitute the device 10 may also contain additives to confer desirable qualities such as flexibility, moldability, heat resistance, and color. Such additives are known in the art.

Figure 2:
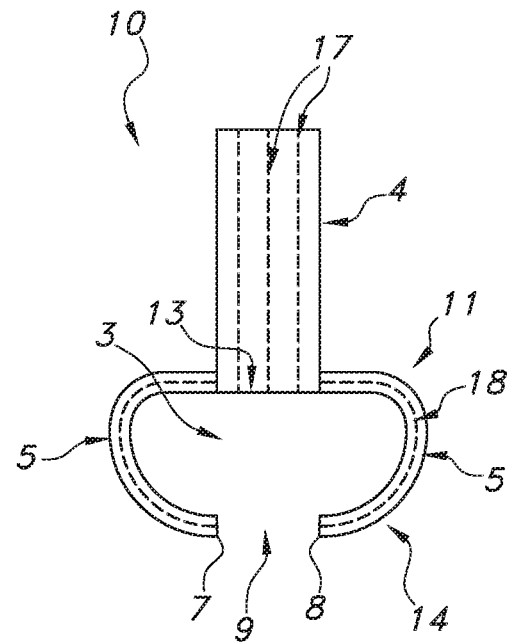
FIG. 2 is a top view of the utensil retaining device shown in FIG. 1, in accordance with an embodiment of the present disclosure.

FIG. 2 is a top view of the utensil securing or retaining device shown in FIG. 1, in accordance with an embodiment of the present disclosure. Shown in FIG. 2 is a top view of the utensil holder device 10 including the perimeter of the top edge 5 of the main U-shaped body portion 11 which comprises a flexibly moldable circular band portion 14 of the device 10 as shown in FIG. 1, that has a first end 7 and second end 8 with open slot or space 9 therebetween, that form for example, a u-shape. The main body portion 11 is integral to and extends from the top middle portion 13 of the main body 11 and supports the extension hook portion 4 of the device 10. The band portion 14 is moldable and flexibly grips the circumference of the handle portion of a utensil, serving utensil, tool instrument or other tools. The extension hook 4 is configurable to mold and engage with a serveware, tray, pot or other vessel, and can also simultaneously secure a utensil within the retaining space 3 of the device 10. The top edge portion 5 of the band portion 14 is integral from its center 13 with the extension hook portion 4 and supports the extension hook portion 4 from center 13. In certain embodiments, a utensil retaining volume 3 is adaptable to mold and flexibly grip the circumference or perimeter of a utensil 40, serving utensil, tool, instrument, or other type of instrument or tool including medical or dental instruments or other handheld tools (as is illustrated and further described in connection with FIGS. 4-7). The slot or space 9 formed between ends 7 and 8, is of a particular size in its natural non-extended state and is configurable to expand and be molded to the size and circumference of the size, dimension and/or circumference of the utensil 40. The band portion 11 may be molded to diminish the size of the slot 9 for gripping or retaining smaller utensils having smaller sized circumferences for the handle portion 45. Alternatively, the band portion 11 may be enlarged from its natural non-extended state by flexible expansion of the u-shaped band portion 14, which in turn expands the utensil receiving space 3, to grip or hold utensil 40, or a tool via its handle portion 45, and in certain embodiments, handle portions 45 having larger sized circumference(s) than the size of the original un-extended retaining space 3. The bottom edge portion 15 is longitudinal and parallel with the top edge portion 5 of the main body portion 11.

Figure 3:
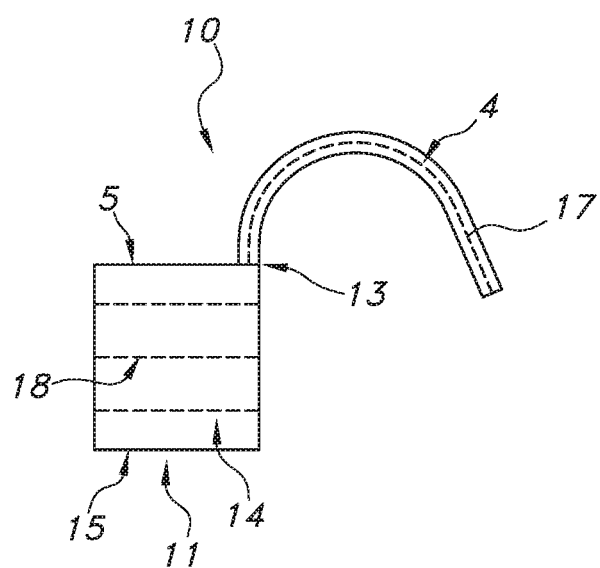
FIG. 3 is a side view of the utensil retaining device shown in FIG. 1 in accordance with an embodiment of the present disclosure.

FIG. 3 is a side view of the utensil retaining device shown in FIG. 1, in accordance with an embodiment of the present disclosure. Shown in FIG. 3 is an enlarged side view of the utensil securing or retaining device as shown in FIG. 1, including a side view of the perimeter of the top edge 5 of the main U-shaped body portion 11 which comprises a flexibly moldable circular band portion 14. The main body portion 11 is integral to and extends from the top middle portion 13 of the main body 11 and supports the extension hook portion 4 of the device 10 and may be molded into any form for gripping securely onto the vessel, bowl or serveware. The band portion 14 is moldable and flexibly grips the circumference of a handle portion 45 of a utensil 40, serving utensil, tool instrument or other tools. The extension hook 4 is flexible and thereby, configurable to mold into any shape in order to engage securely with a serveware, tray, pot or other vessel, and can also simultaneously secure a utensil within the retaining space 3 as shown in FIGS. 1 and 2, of the device 10. The top edge portion 5 of the band portion 14 is integral from its center 13 with the extension hook portion 4 and supports the extension hook portion 4 from center 13. In certain embodiments, a utensil retaining volume 3 as shown in FIGS. 1 and 2, is adaptable to mold and flexibly grip the circumference or perimeter of a utensil 40, serving utensil, tool, instrument, or other type of instrument or tool including medical instruments (as is illustrated and further described in connection with FIGS. 4-7). The slot or space 9 between ends 7 and 8, is at a particular size in its natural non-extended state and is configurable to expand. The band portion 11 may include one or more wire filaments or thin bendable wires 18 internal to the center of the band portion such that the band portion 11 may be molded to diminish the size of the slot 9 as shown in FIGS. 1 and 2, for gripping or retaining smaller sized utensils 40, for example having smaller sized circumferences or thinner and/or flatter shaped handle portion(s) 45. Alternatively, the band portion 11 may be enlarged from its natural non-extended state by flexible expansion of the u-shaped band portion 14, which in turn expands the utensil receiving space 3, to grip or hold utensil or tool 41 at its handle portion 45, in particular handle portion (s) 45 having larger sized circumference(s). The one or more flat or thin wire filaments or other types of thin bendable wires 18 internal to the center of the band portion 14, which permits the main body portion 11 to be moldable and expandable to adapt to the size of the slot 9, as shown in FIGS. 1 and 2, for securing a larger sized utensil 40 or tool, therebetween. The bottom edge portion 15 is longitudinal relative to the top edge portion 5 of the main body portion 11, thereby defining a utensil entrance and space for retaining the utensil therebetween.

FIG. 4 is a top perspective view of a utensil affixed to serveware in accordance with an embodiment of utensil holder device as shown in FIG. 1. Shown in FIG. 4 is serveware such as a bowl 41, which includes curved exterior surface 44 and top edge perimeter 43 having a particular width 47. The semi-circular u-shaped band portion 14 is moldable and flexibly grips the circumference and particular shape and thickness of a handle portion 45 of a utensil 40, serving utensil, tool instrument or other tools. The extension hook 4 is flexible and thereby, configurable to mold into any shape in order to engage securely with any serveware, tray, pot or other vessel, shown in FIG. 4 as bowl 41. In certain embodiments, a utensil retaining volume 3 as shown in FIGS. 1 and 2, defined by the interior surface of band portion 14, is adaptable to mold and flexibly grip the circumference or perimeter of the handle portion 45 of the utensil 40, serving utensil, tool, instrument, or other type of instrument or tool including medical instruments (as is illustrated and further described in connection with FIGS. 4-7). The hook extension portion 4 is molded to adapt to the shape and width 47 of the top edge portion 43 and exterior outer surface 44 of the bowl 41. The utensil is thereby securely fastened within the device 10 as the interior surface of the u-shaped band portion 14 flexibly grips the utensil 40 handle 45, regardless of the type of surface and level of smoothness. The device 10 further, simultaneously secures the utensil 45 via the extension hook 4, to the top edge 43 of the bowl 41 regardless of the shape or curvature of the exterior surface 44 of the bowl 41, and even further, regardless of the width 47 of the top edge 43 of the bowl 41. The device 10 thereby securely retains the utensil 40 in place as affixed to the bowl 41, and prevents slippage of the utensil 40 into the serving bowl 41.

FIG. 5 is a side view of the utensil handle and partial view of the utensil holder device as shown in FIG. 4, as affixed to serveware in accordance an embodiment of the present disclosure. Shown in FIG. 5 is serveware such as a bowl 41, which includes curved exterior surface 44 and top edge perimeter 43 having a particular width. The u-shaped band portion 14 as shown in FIG. 4, is moldable and flexibly grips the circumference and particular shape and thickness of a handle portion 45 of a utensil 40, serving utensil, tool instrument or other tools. The extension hook 4 is flexible and thereby, configurable to mold into any shape in order to engage securely with any serveware, tray, pot or other vessel, shown in FIG. 5 bowl 41. In certain embodiments, a utensil retaining volume 3 as shown in FIGS. 1 and 2, defined by the interior surface of band portion 14, is adaptable to mold and flexibly grip the circumference or perimeter of the handle portion 45 of the utensil 40, serving utensil, tool, instrument, or other type of instrument or tool including medical instruments (as is illustrated and further described in connection with FIGS. 4-7). The hook extension portion 4 is molded to adapt to the shape and any particular contours of the top edge portion 43 and exterior outer surface 44 of the bowl 41. The utensil 40 is thereby securely fastened within the device 10 as the interior surface of the u-shaped band portion 14 flexibly grips the utensil 40 regardless of the type of surface and level of smoothness of the handle portion 45. The device 10 further, simultaneously secures the utensil 40 via the extension hook 4, to the top edge 43 of the bowl 41 and regardless of the shape or curvature of the exterior surface 44 of the bowl 41, and even further, regardless of the width of the top edge 43 of the bowl 41. The device 10 thereby securely retains the utensil 40 in place as affixed to the bowl 41, and prevents slippage of the utensil 40 into the serving bowl 41.

FIG. 6 is a top perspective view of the utensil holder device securing a utensil to serving ware, such as a rectangular shaped tray, in accordance with an embodiment of the present disclosure. Shown in FIG. 6 is serveware such as a tray or rectangular serving dish 60, which includes flat exterior surface 64 and top edge perimeter 61 having a particular width 62. The u-shaped band portion 14 of the device 10 such as shown in FIG. 4, is moldable and flexibly grips the circumference and particular shape and thickness of a handle portion 45 of a utensil 40, serving utensil, tool instrument or other tools. As described hereinabove, the extension hook 4 is flexible and thereby, configurable to mold into any shape in order to engage securely with any serveware, tray, pot or other vessel, shown in FIG. 6 as tray or dish 60. In certain embodiments, a utensil retaining volume 3 as shown in FIGS. 1 and 2, defined by the interior surface of band portion 14, is adaptable to mold and flexibly grip the circumference or perimeter of the handle portion 45 of the utensil 40, serving utensil, tool, instrument, or other type of instrument or tool including medical instruments (as is illustrated and further described in connection with FIGS. 4-7). The hook extension portion 4 is molded to adapt to the shape and any particular contours of the top edge portion 61 of the tray 60, and further adaptable to the exterior outer surface 64 of the tray 60. The utensil 40 is thereby securely fastened within the device 10 as the interior surface of the u-shaped band portion 14 flexibly grips the utensil 45 regardless of the type of surface and level of smoothness of the utensil 40 or the handle portion 45. The device 10 further, simultaneously secures the utensil 40 at its handle portion 45 via the extension hook 4, to the top edge 43 of the bowl 41 regardless of the shape or relative curvature of the exterior surface 64 of the tray 60, and even further, regardless of the size of the width 62 at the top edge 61 of the tray 60. The device 10 thereby securely retains the utensil 40 in place as affixed to the tray 60, and prevents slippage of the utensil 40 into the serving tray or dish 60.

FIG. 7 is a side view of the utensil holder device 10 as secured to serveware and further securing a utensil to the serving ware in accordance an embodiment of the present disclosure. Shown in FIG. 7 is serveware such as a tray or rectangular serving dish, 60 which includes flat exterior surface 64 and top edge perimeter 61 having a particular width 62. The u-shaped band portion 14 of the device 10 such as shown for example in FIG. 4, is moldable and flexibly grips the circumference and particular shape and thickness of a handle portion 45 of a utensil 40, serving utensil, tool instrument or other tools. As described hereinabove, the extension hook 4 is flexible and thereby, configurable to mold into any shape in order to engage securely with any serveware, tray, pot or other vessel, shown in FIG. 7 as tray or dish 60. In certain embodiments, a utensil retaining volume 3 as shown in FIGS. 1 and 2, defined by the interior surface of band portion 14, is adaptable to mold and flexibly grip the circumference or perimeter of the handle portion 45 of the utensil 40, serving utensil, tool, instrument, or other type of instrument or tool including medical instruments (as is illustrated and further described in connection with FIGS. 4-7). The hook extension portion 4 is molded to adapt to the shape and any particular contours of the top edge portion 61 of the tray 60, and further various contours of exterior outer surfaces 64 of the tray 60. The utensil 40 is thereby securely fastened within the device 10 as the interior surface of the u-shaped band portion 14 flexibly grips the utensil 45 regardless of the type of surface and level of smoothness of the utensil 40 or the handle portion 45. The device 10 further, simultaneously secures the utensil 40 at its handle portion 45 via the extension hook 4, to the top edge 43 of the bowl 41 regardless of the shape or relative curvature of the exterior surface 64 of the tray 60, and even further, regardless of the size of the width 62 at the top edge 61 of the tray 60. The device 10 thereby securely retains the utensil 40 in place as affixed to the tray 60, and prevents slippage of the utensil 40 into the serving tray or dish 60.

Figure 8:
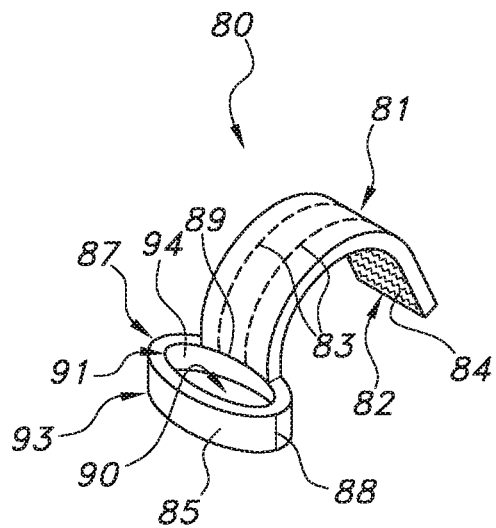
FIG. 8 is a top perspective view of the utensil holder device in accordance with an embodiment of the present disclosure.

FIG. 8 is a top perspective view of a utensil holder device 80 in accordance with another embodiment of the present disclosure. In such alternate embodiment, a utensil retaining device 80 includes a main body portion 87 including a circular shaped band 85 having a variable width 88, and an extension hook portion 81 that is integral to the main body portion 87. The extension hook portion 81 may be an integral extension member, an extension member, a curved extension member, a curvi-linear shaped extension member and/or a linear extension portion of the device 10. The band portion 85 is moldable and flexibly grips the circumference of the handle portion of a utensil, serving utensil, tool instrument or other tools. The extension hook 81 is configurable to be molded and engaged with a serveware, tray, pot or other vessel, and can also simultaneously secure a utensil within the retaining space 90 of the device 80. The band portion 85 is integral from its center 89 with the extension hook portion 81 and supports the extension hook portion 81 from center 89. In certain embodiments, the main body portion 87 may be defined by a circular wall that extends longitudinally at width 88 between the top edge 91 and bottom edge 93 of the main body 87. The retaining space 90 is adaptable to and expandable to stretch the defining circumference 94 and in turn, flexibly grip the circumference or perimeter of a utensil 40, serving utensil, tool, instrument, or other type of instrument or tool including medical instruments (as is illustrated and further described in connection hereinabove, with FIGS. 4-7 and hereinbelow, in connection with FIGS. 11-12).

In certain embodiments, the extension hook 81 is a curved member, which is integral to and extends outwardly from the body portion 87 at center portion 89 of main body 87. The extension hook 81 in certain embodiments may further comprise a plurality of flexible filaments or thin flexible wires interior to the extension hook 81, shown as dotted lines 83, such that the hook portion 81 is easily adaptable to be securely affixed to and/or removably attached to various shaped contours of upper edges 43 of serveware, and further adapatable to the contours of exterior surfaces 44 of serveware, or other vessels, such as a bowl 41 (as shown in FIGS. 4 and 5) and a vessel or tray 60 for food or other material (as shown in FIGS. 6 and 7). In the shown embodiment, the extension hook 81 is integrally formed and extends from the body portion 87. The inner surface 84 of extension hook 81 is adapted to grip onto the upper contours and exterior surfaces 44, 64 of bowl 41 or tray 60, respectively. The circumference of inner retaining walls 94 of the circular band portion 85 which extends lengthwise 88 between top edge 91 and bottom edge 93, defines a utensil retaining volume or retaining space 90.

A utensil 40 can be inserted through the defined retaining space 90, and held by the inner retaining walls 94 in a gripping fashion, and thereby secured to the utensil retaining device 80. The body portion 87 is dimensioned such that the utensil 40 is secured and accommodated within the utensil retaining space or volume 90, with sufficient traction or squeezable force to receive and retain a utensil 40, as shown in FIG. 8.

In certain embodiments, shown in the underside 82 of the extension hook 81 are ridges 84 along the surface of the underside 19 that function to increase the gripping surface and therefore permitting the device 80 to be more securely affixed to the serveware without risk of slippage therefrom. In certain embodiments, in order to improve the grip between the device and the surface of the serveware the device is affixed to, a modification in the surface on the underside 82 of the hook portion 81 is introduced, usually in the shape of ridges 84 or similar introduction of less smooth surface including other shaped indentations. However, there is a variability in the characteristics of these ridges, with heights varying between for example, 0.1 and 5 mm, widths between 0.1 and 9.5 mm, and spacing between 0.2 and 5.5 mm. The characteristics of these textures are usually based on variable design in order to increase the performance of the device 80 and prevent slippage of the device 80 from the serveware by increasing the friction therebetween, including the exterior surfaces of serveware and the gripping surface of the device 80.

In an alternate embodiment, the extension hook portion 81 is connected to and removably attached to the body portion 87 of the device 80, via some other connective material such as for example, Velcro®, glue or other heat-resistant fastener. In yet another embodiment, the extension hook portion 81 is affixed to the exterior surfaces 44 of the serveware 41 or other vessel or tray 60, via a fastener such as for example, Velcro®, glue. In yet another embodiment, the extension hook portion 81 is permanently affixed to the exterior surfaces 44 of the serveware 41 or other vessel or tray 60, via a permanent fastener secured to the outer surface 44, 64 of the serving bowl 40 or tray 60.

In a preferred embodiment, the device 80 is comprised of heat resistant material such as polymers having specific heat capacities or other flexible moldable polymeric material. Examples of suitable polymeric materials that are flexible and moldable include silicone, polyurethane, polyethylene, polystyrene, polyolefin, polyacrylate, polyester, polyamide, polysulfone based polymers, and combinations thereof. Examples of polymers having their specific heat capacities are polytetrafluoroethylene (PTFE) with a specific heat capacity of 970 $J \cdot kg^{-1} \cdot K^{-1}$; polyethylene has a specific heat capacity of 1550 $J \cdot kg^{-1} \cdot K^{-1}$; and polystyrene with a specific heat capacity of 1110 $J \cdot kg^{-1} \cdot K^{-1}$. The polymers may further contain additive to confer desirable qualities such as flexibility, moldability, heat resistance, and color. Such additives are known in the art.

In yet another embodiment, the utensil retaining device 80 may be coated with a material that has a specific heat capacity of greater than the utensil itself, for example, a stainless steel utensil. For example, the utensil 40 may have a heat capacity of for example, greater than 500 $J \cdot kg^{-1} \cdot K^{-1}$ (the capacity of stainless steel), greater than 750 $J \cdot kg^{-1} \cdot K^{-1}$, or even greater than 1000 $J \cdot kg^{-1} \cdot K^{-1}$.

Figure 9:
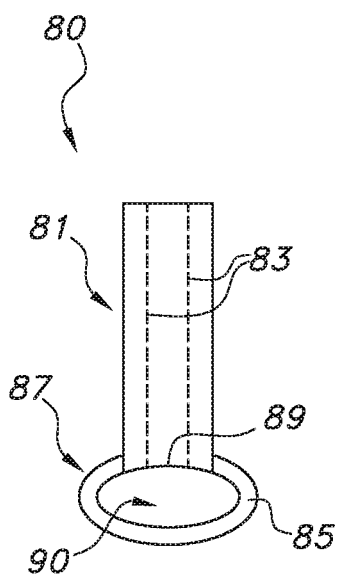
FIG. 9 is a top view of the utensil holder device as shown in FIG. 8, in accordance with an embodiment of the present disclosure.

FIG. 9 is a top view of the utensil holder device 80 as shown in FIG. 8, in accordance with an embodiment of the present disclosure. Shown in FIG. 9 is a top view of the utensil retaining device 80 which includes a main body portion 87 including a circular shaped band 85 having a variable width 88, and an extension hook portion 80 that is integral to the main body portion 87 (as described hereinabove in connection with FIG. 8). As described hereinabove, the band portion 85 is moldable and flexibly grips the circumference of the handle portion of a utensil, serving utensil, tool instrument or other tools. The extension hook 81 is configurable to be molded and engaged with a serveware, tray, pot or other vessel, and can also simultaneously secure a utensil within the retaining space 90 of the device 80. The band portion 85 is integral from its center 89 with the extension hook portion 81 and supports the extension hook portion 81 from center 89. In certain embodiments, the main body portion 87 may be defined by a circular wall that extends longitudinally at width 88 between the top edge 91 and bottom edge 93 of the main body 87. The retaining space 90 is adaptable to and expandable to stretch the defining circumference 94 and in turn, flexibly grip the circumference or perimeter of a utensil 40, serving utensil, tool, instrument, or other type of instrument or tool including medical instruments (as is illustrated and further described in connection hereinabove, with FIGS. 4-7 and hereinbelow, with FIGS. 11-12).

In certain embodiments, the extension hook 81 is a curved member, which is integral to and extends outwardly from the body portion 87 at center portion 89 of main body 87. The extension hook 81 in certain embodiments may further comprise a plurality of flexible filaments or thin flexible wires in the inner portion or interior portion of extension hook 81, shown as dotted lines 83, such that the hook portion 81 is easily adaptable or flexibly moldable to be securely affixed to and/or removably attached to various shaped contours of upper edges 43 of serveware, and further configurable according to the contours of exterior surfaces 44 of serveware, or other vessels, such as a bowl 41 (as shown in FIGS. 4 and 5) and a vessel or tray 60 for food or other material (as shown in FIGS. 6 and 7). In the shown embodiment, the extension hook 81 is integrally formed and extends from the body portion 87. The inner surface 84 of extension hook 81 is adapted to grip onto the upper edge contours 43 and exterior surfaces 44, 64 of bowl 41 or tray 60, respectively. A utensil 40 can be inserted through the defined retaining space 90, and held by the inner retaining walls 94 in a gripping fashion, and thereby secured to the utensil retaining device 80. The body portion 87 is dimensioned such that the utensil 40 is secured and accommodated within the utensil retaining space or volume 90, with sufficient traction or squeezable force to receive and retain a utensil 40, as shown in FIG. 9.

Figure 10:
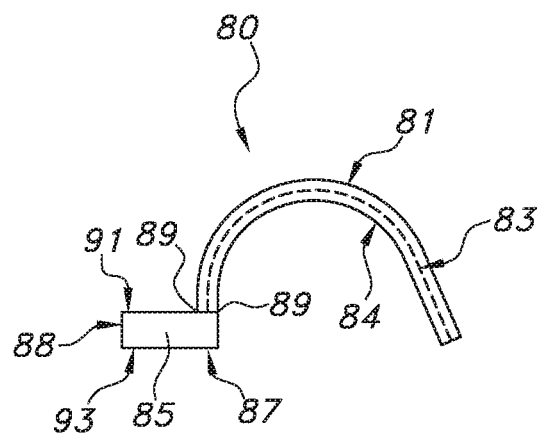
FIG. 10 is a side view of the utensil holder device as shown in FIG. 8, in accordance with an embodiment of the present disclosure.

FIG. 10 is a side view of the utensil holder device as shown in FIG. 8, in accordance with an embodiment of the present disclosure. Shown in FIG. 10 is a side view of the utensil retaining device 80 which includes a main body portion 87 including a circular shaped band 85 having a variable width 88 that extends between top edge 91 and bottom edge 93, and further includes an extension hook portion 81 that is integral to the main body portion 87 (as described hereinabove in connection with FIG. 8). As described hereinabove, the band portion 85 is moldable and flexibly grips the circumference of the handle portion of a utensil, serving utensil, tool instrument or other tools. The extension hook 81 is configurable to be molded and engaged with a serveware, tray, pot or other vessel, and can also simultaneously secure a utensil within the retaining space 90 of the device 80. The band portion 85 is integral from its center 89 with the extension hook portion 81 and supports the extension hook portion 81 from center 89. In certain embodiments, the main body portion 87 may be defined by a circular wall that extends longitudinally at width 88 between the top edge 91 and bottom edge 93 of the circular band portion 85 of the main body 87. The retaining space 90 is adaptable to and expandable to stretch the defining circumference 94 (as shown in FIG. 8), and in turn, flexibly grips the outer surface of the circumference of the handle portion 45 of utensil 40, serving utensil, tool, instrument, or other type of instrument or tool including medical instruments (as is illustrated and further described in connection with FIGS. 4-7 hereinabove, and FIGS. 11 and 12, hereinbelow).

In certain embodiments, the extension hook 81 is a curved member, which is integral to and extends outwardly from the body portion 87 at center portion 89 of main body 87. The extension hook 81 in certain embodiments may further comprise a plurality of flexible filaments or thin flexible wires in the inner portion or interior portion of extension hook 81, shown as dotted lines 83, such that the hook portion 81 is easily adaptable or flexibly moldable to be securely affixed to and/or removably attached to various shaped contours of upper edges 43, 61 of serveware, and further configurable according to the contours of exterior surfaces 44, 64 of serveware, or other vessels, such as a bowl 41 (as shown in FIGS. 4 and 5) and a vessel or tray 60 for food or other material (as shown in FIGS. 6 and 7). In the shown embodiment, the extension hook 81 is integrally formed and extends from the body portion 87. Inner surface 84 of utensil hook 81 directly affixes to the upper edges 43, 61 of serveware or exterior surfaces 44, 64 of serveware, such as a bowl 41 or tray 60, respectively.

Figure 11:
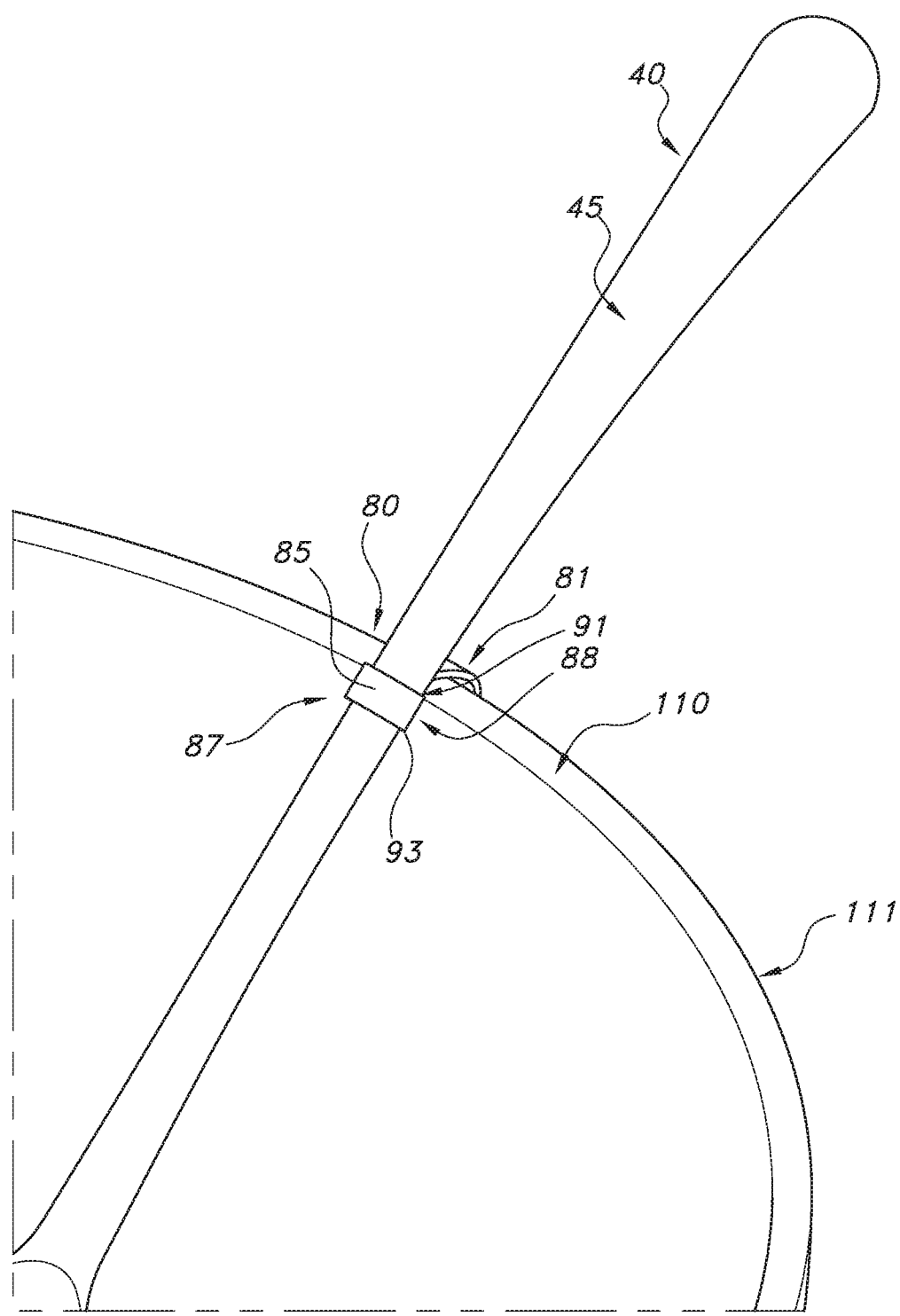
FIG. 11 is a top perspective view of the utensil holder device securing a utensil to the outer rim of serving ware, in accordance with an embodiment of the present disclosure.

FIG. 11 is a top perspective view of the utensil holder device 80 securing a utensil 40 to the outer rim 110 of serving ware such as bowl 111, in accordance with an embodiment of the present disclosure. The main body portion 87 includes a circular shaped band 85 having a variable width 88 that extends between top edge 91 and bottom edge 93, and further includes an extension hook portion 81 that is integral to the main body portion 87 (as described hereinabove in connection with FIG. 8). As described hereinabove, the band portion 85 is flexible, moldable and flexibly grips the circumference of the handle portion of a utensil, serving utensil, tool instrument or other tools. The extension hook 81 is configurable to be molded and engaged with a serveware, tray, pot or other vessel, and can also simultaneously secure a utensil within the retaining space 90 of the device 80. The band portion 85 is integral from its center 89 with the extension hook portion 81 and supports the extension hook portion 81 from center 89. In certain embodiments, the main body portion 87 may be defined by a circular wall that extends longitudinally at width 88 between the top edge 91 and bottom edge 93 of the circular band portion 85 of the main body 87. The retaining space 90 is adaptable to and expandable to stretch the defining circumference 94 (as shown in FIG. 8) and in turn, flexibly grips the outer surface of the circumference of the handle portion 45 of utensil 40, serving utensil, tool, instrument, or other type of instrument or tool including medical instruments (as illustrated and further described in connection with FIGS. 4-7 hereinabove, and in connection with FIGS. 11 and 12 hereinbelow).

In certain embodiments, the extension hook 81 is a curved member, which is integral to and extends outwardly from the body portion 87 at center portion 89 of main body 87. The extension hook 81 in certain embodiments may further comprise a plurality of flexible filaments or thin flexible wires in the inner portion or interior portion of extension hook 81, shown as dotted lines 83, such that the hook portion 81 is easily adaptable or flexibly moldable to be securely affixed to and/or removably attached to various shaped contours of upper edges 43, 61 of serveware, and further configurable according to the contours of exterior surfaces 44, 64, 110 of serveware, or other vessels, such as a bowl 41 (as shown in FIGS. 4 and 5); a vessel or tray 60 for food or other material (as shown in FIGS. 6 and 7); or other vessel or serving bowl 111 (as shown in FIG. 11). In the shown embodiment, the extension hook 81 is integrally formed and extends from the body portion 87.

Figure 12:
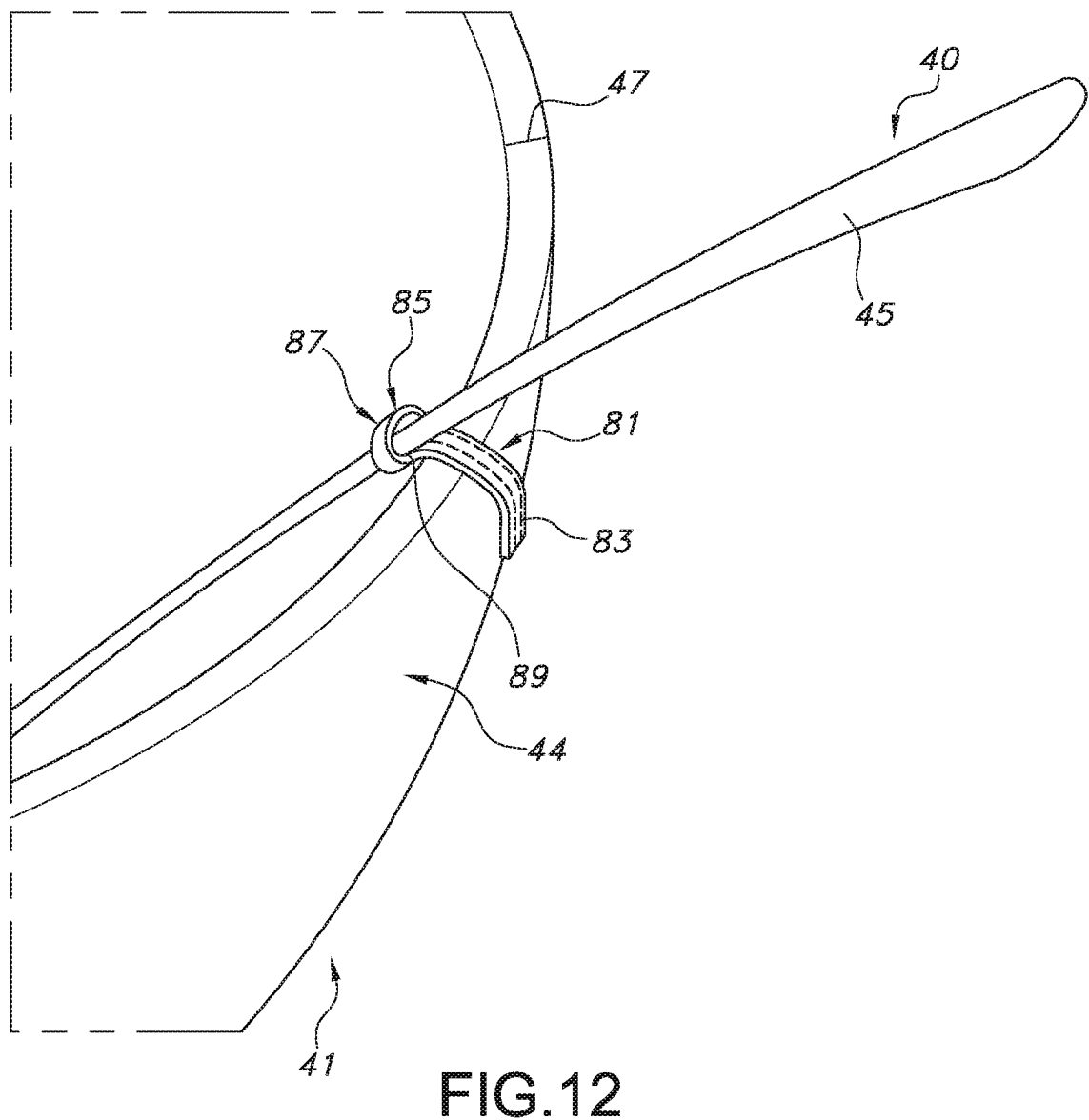
FIG. 12 is a top perspective view of the utensil holder device shown in FIG. 11, with the extension flexibly molded to the outer rim portion of the serving ware, in accordance with an embodiment of the present disclosure.

FIG. 12 is an enlarged top perspective view of the utensil holder device 80 shown in FIG. 11, with the extension hook 81 flexibly molded to the outer rim portion 47 of the serving ware 41, in accordance with an embodiment of the present disclosure. The main body portion 87 includes a circular shaped band 85, and further includes an extension hook portion 81 that is integral to the main body portion 87 (as described hereinabove in connection with FIG. 8). As described hereinabove, the band portion 85 is flexible, moldable and flexibly grips the circumference of the handle portion 45 of a utensil 40, serving utensil, tool, instrument or other handheld tools. The extension hook 81 is configurable to be molded and engage with a serveware, tray, pot or other vessel, and can also simultaneously secure a utensil 40 within the retaining space 90 of the device 80. The band portion 85 is integral from its center 89 with the extension hook portion 81 and supports the extension hook portion 81 from center 89. In certain embodiments, the main body portion 87 may be defined by a circular wall that extends longitudinally at width 88 between the top edge 91 and bottom edge 93 of the circular band portion 85 of the main body 87 (as shown in FIGS. 8 and 10). The retaining space 90 is adaptable to and expandable to stretch the defining circumference 94 (as shown in FIG. 8) and in turn, flexibly grips the outer surface of the circumference of the handle portion 45 of utensil 40, serving utensil, tool, instrument, or other type of instrument or tool including medical instruments (as is illustrated and further described in connection hereinabove, with FIGS. 4-7 and FIGS. 11-12).

Figure 15:
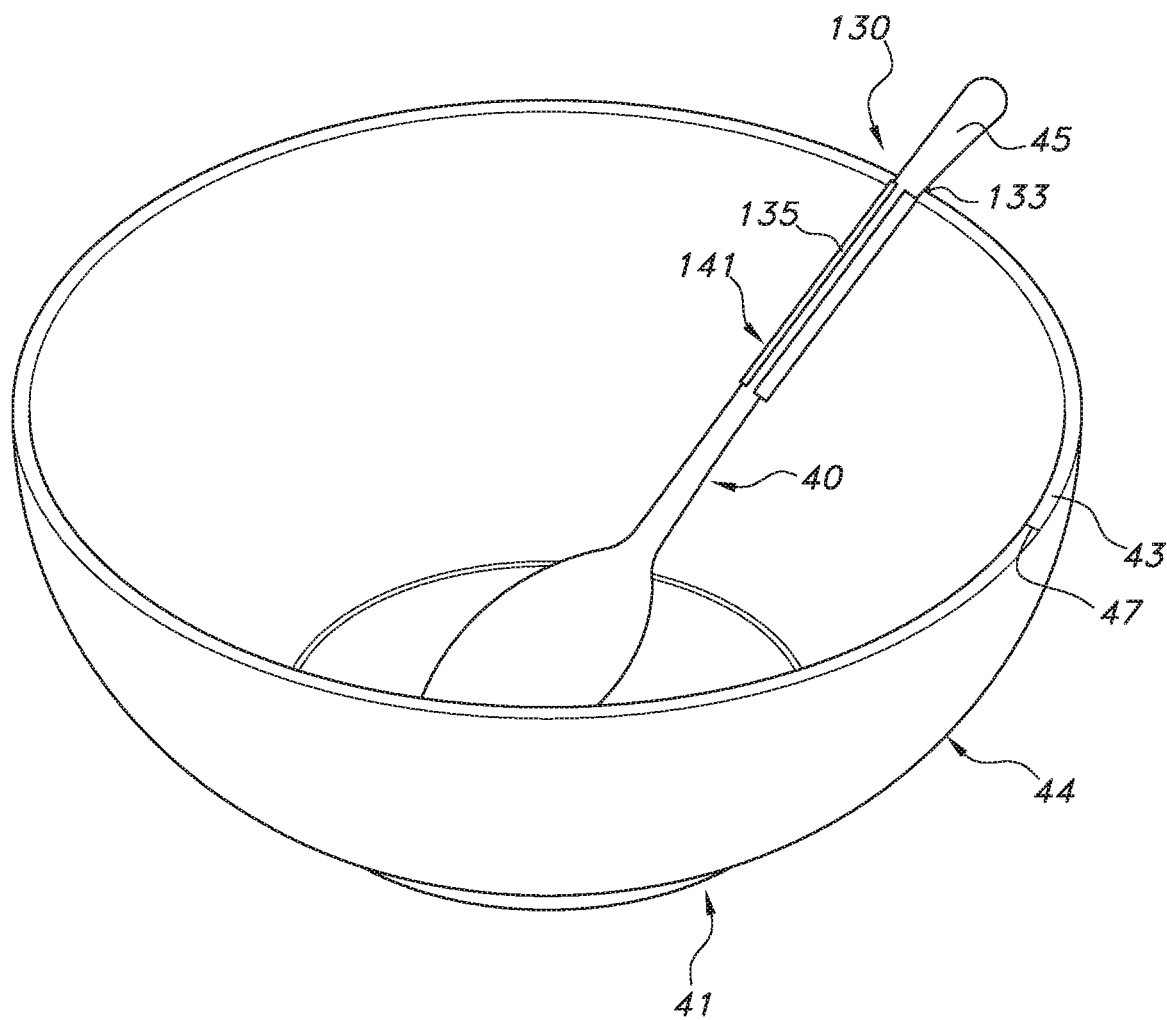
FIG. 15 is a top perspective view of the utensil securing device shown in FIG. 13, securing the utensil to the rim of the serving ware, in accordance with an embodiment of the present disclosure.

FIG. 13 is a perspective view of a utensil holder device that secures a longer portion of the utensil's handle, (than other described embodiments) in accordance with another embodiment of the present disclosure. Shown in FIG. 13 is a utensil retaining device 130 that includes a main body portion 141 having a circular longitudinal wall 135 with open space or slot 137 therebetween. The circular longitudinal wall 135 extends between a first end 138 and a second end 139, thereby defining a utensil retaining space or volume 143 therebetween. The height of the circular longitudinal wall 135 of the body portion 141 is designed and dimensioned such that a larger portion of the handle 45 of a utensil 40 or other handheld tool or instrument can be moldably and flexibly gripped therebetween, as shown in FIG. 15.

The main semi-circular body portion 141 is integral to and extends from the top middle portion 144 of the main body 141 and supports an extension hook portion 133 of the device 130. The longitudinal band portion 135 is moldable and flexibly grips the circumference of the handle portion 45 of a utensil 40, serving utensil, tool instrument or other handheld tools. The extension hook 133 is configurable to mold and engage with a serveware, tray, pot or other vessel, and can also simultaneously secure a utensil within the retaining space 143 of the device 130. The top edge portion 140 of the longitudinal band portion 135 is integral from its center 144 with the extension hook portion 133 and supports the extension hook portion 133 from center 133. In certain embodiments, the body portion 141 may be defined by a semi-circular wall that extends longitudinally between the top edge 140 and bottom ends 138, 139 of the main body 141. In certain embodiments, a utensil retaining device 130 with slot 137, is adaptable to mold and flexibly grip the particular circumference, contours, surfaces and/or perimeter of a utensil 40, serving utensil, tool, instrument, or other type of instrument or tool including medical instruments (as is illustrated and further described in connection with FIGS. 4-7).

The slot or space 137 shown between ends 138 and 139, is of a particular size in its natural non-extended state and is configurable to expand. The band portion 135 may include one or more wire filaments or thin bendable wires 142 internal to the center of the band portion, and which may extend longitudinally from top edge 140 to the bottom edge 145 of the band portion 135, such that the band portion 135 may be molded to diminish the size of the longitudinal slot 137 as shown in FIG. 13, for gripping or retaining smaller sized utensils 40, for example those having smaller sized circumferences or thinner and/or flatter shaped handle portion(s) 45. Alternatively, the band portion 135 may be enlarged from its natural non-extended state by flexible expansion of the semi-circular band portion 135, which in turn expands the utensil retaining space 143, to grip or hold utensil 40 or tool handles 45 having larger sized circumferences. The one or more flat or thin wire filaments or other types of thin bendable wires 18 internal to the center of the band portion 135, which permits the main body portion 141 to be moldable and expandable to adapt to the size of the slot 137, for securing a larger sized utensil 40 or tool, there between. The bottom edge portion 145 is longitudinal and parallel with the top edge portion 140 of the main body portion 141, thereby defining a utensil entrance and space for retaining the utensil 40 therebetween.

In use, the utensil is inserted through the utensil entrance to secure a part of the utensil handle within the utensil retaining volume. With the utensil secured to the body portion of the utensil retaining device, the extension hook is positioned on the upper edge and exterior surface of the serveware. Thereafter, the extension hook is adjusted (by flexing it) to tightly engage with the upper edge and exterior surface of the serveware to retain against slippage into the contents of the serveware.

In certain embodiments, the extension hook portion 133 is a curved member, which extends outwardly from the body portion 141 from center 144 or may form a straight edge that folds downward (not shown). In certain embodiments, the extension hook portion may be an integral extension member, an extension member, a curved extension member, a curvi-linear shaped extension member and/or a linear extension portion of the device 10. The extension hook 133 comprises one or more flexible filaments or thin flexible wires shown as dotted lines 131 such that the hook portion 133 is easily adaptable to be securely affixed to and/or removably attached to various shaped contours of upper edges 43 of serveware, and further adapatable to the contours of exterior surfaces 44 of various serveware 41, or other vessels, such as a bowl 41 (as shown in FIGS. 4 and 5) and a vessel or tray for food or other material (as shown in FIGS. 6 and 7). In the shown embodiment, the extension hook 133 is integrally formed and extends at center 144 from the body portion 135.

In certain embodiments, shown in the underside 134 of the extension hook 133 are ridges 147 along the surface of the underside 134 that function to increase the gripping surface and therefore permitting the device 130 to be more securely affixed to the serveware without risk of slippage therefrom. In certain embodiments, in order to improve the grip between the device and the surface of the serveware the device is affixed to, a modification in the surface on the underside 134 of the hook portion 133 is introduced, usually in the shape of ridges 147 or similar introduction of less smooth surface including other shaped indentations. However, there is a variability in the characteristics of these ridges, with heights varying between for example, 0.1 and 5 mm, widths between 0.1 and 9.5 mm, and spacing between 0.2 and 5.5 mm. The characteristics of these textures are usually based on variable design in order to increase the performance of the device 130 and prevent slippage of the device 130 from the serveware by increasing the friction therebetween, including the exterior surfaces of serveware and the gripping surface of the device 130.

In an alternate embodiment, the extension hook portion 133 is connected to and removably attached to the main body portion 141 of the device 130, via some other connective material such as for example, Velcro®, glue or other heat-resistant fastener. In yet another embodiment, the extension hook portion 4 is affixed to the exterior surfaces 44 of the serveware 41 or other vessel or tray, via a fastener such as for example, Velcro® or glue. In yet another embodiment, the extension hook portion 133 is permanently affixed to the exterior surfaces 44 of the serveware or other vessel or tray, via a permanent fastener secured for example, to the outer surface 44 of the serving bowl 41 or tray 60.

In yet a further embodiment, a simple handle retaining device of the type is described herein in connection with FIG. 13 (and FIGS. 14 and 15 further described hereinbelow), in which said handle portion 135 is adapted to remain either on the handle during use to absorb excessive heat on the handle of the utensil as a result of the property of conduction of heat in a metal utensil and/or to disengage the device 130 from the vessel during such use in accordance with the preference of the user. The user can continue to use the utensil with the device 130 attached thereto, and the device 130 would function to absorb any heat that was conducted throughout the utensil and the handle during cooking.

A still further object of the invention is to provide a handle engaging device 130 which maintains an association with the cooking vessel whereby it will be readily removable therefrom, yet which device will still be capable of keeping the utensil from submerging into the food and also functions to absorb the heat conducted about the handle portion whether or not connected to the vessel.

In a preferred embodiment, the device 130 is comprised of heat resistant material such as polymers having specific heat capacities or other flexible moldable polymeric material. Examples of suitable polymeric materials that are flexible and moldable include silicone, polyurethane, polyethylene, polystyrene, polyolefin, polyacrylate, polyester, polyamide, polysulfone based polymers, and combinations thereof. Examples of polymers having their specific heat capacities are polytetrafluoroethylene (PTFE) with a specific heat capacity of 970 $J\cdot kg^{-1}\cdot K^{-1}$; polyethylene has a specific heat capacity of 1550 $J\cdot kg^{-1}\cdot K^{-1}$; and polystyrene with a specific heat capacity of 1110 $J\cdot kg^{-1}\cdot K^{-1}$. The polymers may further contain additive to confer desirable qualities such as flexibility, moldability, heat resistance, and color. Such additives are known in the art.

In yet another embodiment, the utensil retaining device 130 may be coated with a material that has a specific heat capacity of greater than the utensil itself, for example, a stainless steel utensil. For example, the utensil may have a heat capacity of for example, greater than 500 $J\cdot kg^{-1}\cdot K^{-1}$ (the capacity of stainless steel), greater than 750 $J\cdot kg^{-1}\cdot K^{-1}$, or even greater than 1000 $J\cdot kg^{-1}\cdot K^{-1}$.

In one embodiment, the utensil 40 is made of and/or is coated with stainless steel, and has an approximate specific heat capacity of 500 $J\cdot kg^{-1}\cdot K^{-1}$ Therefore, the device 10 in such embodiment, would have a specific heat capacity of greater than 500 $J\cdot kg^{-1}\cdot K^{-1}$. An example of material that has a specific heat capacity of greater than 500 $J\cdot kg^{-1}\cdot K^{-1}$, includes silicone rubber (generally having a specific heat capacity of between 1300-1500 $J\cdot kg^{-1}\cdot K^{-1}$). In a preferred embodiment, the device 10 generally has a specific heat capacity that is greater than the utensil so that it is heat resistant when for example, a utensil or tool is being secured to the device 130 and the utensil or tool is made of aluminum (including alloys of aluminum), stainless steel, silver and other less common materials.

It is noted that the device 130 is flexible and moldable at room temperature. The polymers that constitute the device 130 may also contain additives to confer desirable qualities such as flexibility, moldability, heat resistance, and color. Such additives are known in the art.

FIG. 14 is a side view of the utensil securing device shown in FIG. 13, in accordance with an embodiment of the present disclosure.

FIG. 15 is a top perspective view of the utensil securing device shown in FIG. 13, securing the utensil to the rim of the serving ware, in accordance with an embodiment of the present disclosure.

As described in connection with FIG. 13, shown in FIGS. 14-15, is a utensil retaining device 130 includes a main body portion 141 having a semi-circular longitudinal wall 135 and an extension hook portion 133. The circular longitudinal wall 135 extends between a first end 138 and a second end 139, thereby defining a utensil entrance therebetween. The height of the semi-circular longitudinal wall 135 of the body portion 141 is designed and dimensioned such that a larger or longer portion of the utensil's 40 handle 45 can be flexibly gripped within retaining volume 143, by flexibly molding the circular longitudinal wall 135 so the retaining space 143 is smaller, and can retain the utensil 41 securely therein, as shown in FIGS. 13-15.

Shown in FIG. 15 is serveware such as a bowl 41 which includes curved exterior surface 44 and top edge perimeter 43 having a particular width 47. The longitudinal semi-circular shaped band portion 135 is moldable and flexibly grips the circumference and particular shape and thickness of a handle portion 45 of a utensil 40, serving utensil, tool instrument or other tools. The extension hook 133 is flexible and thereby, configurable to mold into any shape in order to engage securely with any serveware, tray, pot or other vessel, shown in FIG. 15 as bowl 41. In certain embodiments, a utensil retaining volume 143 as shown in FIG. 13, defined by the interior surface of band portion 133, is adaptable to mold and flexibly grip the outer circumference or perimeter of the handle portion 45 of the utensil 40, serving utensil, tool, instrument, or other type of instrument or tool including medical instruments. The hook extension portion 4 is molded to adapt to the shape and width 47 of the top edge portion 43 and exterior outer surface 44 of the bowl 41. The utensil 40 is thereby securely fastened within the device 130 as the interior surface of the u-shaped band portion 135 flexibly grips the handle portion 45 of utensil 40 regardless of the type of surface and level of smoothness of the utensil 40. The device 130 further, simultaneously secures the utensil 45 via the extension hook 133, to the top edge 43 of the bowl 41 regardless of the shape or curvature of the exterior surface 44 of the bowl 41, and even further, regardless of the width 47 of the top edge 43 of the bowl 41. The device 133 thereby securely retains the utensil 40 in place as affixed to the bowl 41, and prevents slippage of the utensil 40 into the serving bowl 41.

From the foregoing, it will be appreciated that a utensil retaining device according to any of the embodiments of the present disclosure permits a utensil to be secured to the utensil retaining device while simultaneously securing the utensil to the vessel or serveware, thereby preventing the utensil from being submerged in the contents of the serveware.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

The invention claimed is:

1. A flexible utensil retaining device comprising:
a body portion extending between a first end and a second end, the body portion defining a variable utensil retaining volume, the body portion being flexible and capable of being molded to adapt to a size of a utensil and a shape of the utensil, the body portion being heat resistant; and
an extension member being integral with the body portion, the extension member being heat resistant and including at least one flexible wire therewithin, the extension member being flexibly adapted to attach securely to a contour of an edge of a vessel and a contour of an exterior surface of the vessel;
wherein the body portion is capable of securing the utensil to the vessel at an adjustable angle thereto, the body portion is capable of insulating the utensil securely therewithin during heating, thereby permitting handling of the utensil after retention therein, and the flexible utensil retaining device is capable of preventing contamination of contents of the vessel with contaminants on a surface of the utensil;
wherein the body portion comprises a top edge integral with the extension member at a center of the top edge;
wherein the extension member comprises an underside portion including a ridged surface to increase friction and prevent slippage from a grip of the vessel; and
wherein the flexible utensil retaining device is coated with a material that has a specific heat capacity greater than a specific heat capacity of stainless steel.

2. The flexible utensil retaining device of claim 1, wherein the body portion is capable of moldably and flexibly gripping a circumference of a handle portion of the utensil.

3. The flexible utensil retaining device of claim 2, wherein the body portion is capable of being used to retain a serving utensil, a cutlery item, a tool, or a medical instrument.

4. The flexible utensil retaining device of claim 1, wherein the extension member is flexible and extends outwardly from the body portion.

5. The flexible utensil retaining device of claim 1, wherein the body portion comprises one or more filaments or wires internal thereto for molding the body portion to a handle of the utensil.

6. The flexible utensil retaining device of claim 1, wherein the body portion is capable of flexibly retaining a portion of a handle of the utensil by being molded to a shape of the portion of the handle of the utensil, and moldably and flexibly gripping the portion of the handle of the utensil.

7. The flexible utensil retaining device of claim 1, further comprising a heat resistant material including one or more polymers, wherein each of the one or more polymers has a specific heat capacity.

8. The flexible utensil retaining device of claim 7, wherein the heat resistant material comprises one or more of: silicone, polyurethane, polyethylene, polystyrene, polyolefin, polyacrylate, polyester, polyamide, and polysulfone based polymers.

9. The flexible utensil retaining device of claim 1, further comprising an opening formed between the first end and the second end, wherein the opening is of a predetermined width in an original state.

10. The flexible utensil retaining device of claim 9, wherein the predetermined width is adjustable to accommodate utensils with handles of different sizes.

11. The flexible utensil retaining device of claim 9, wherein the opening is capable of being decreased in size in order to grip the utensil requiring a smaller utensil retaining volume.

12. A flexible utensil retaining device comprising:
a body portion comprising a longitudinal wall, the longitudinal wall extending between a first open end and a second open end, the longitudinal wall defining a variable utensil retaining volume, the longitudinal wall being flexible and capable of being molded to adapt to a size of a utensil and a shape of the utensil, the longitudinal wall being heat resistant; and
an extension member being integral with the body portion, the extension member being heat resistant and including one or more flexible wires therewithin, the extension member capable of being flexibly adapted to attach securely to a contour of an edge of a vessel and a contour of an exterior surface of the vessel;
wherein the longitudinal wall of the body portion is capable of retaining the utensil therewithin, the body portion is capable of securing the utensil to the vessel at an adjustable angle thereto, the body portion is capable of insulating the utensil during heating, thereby permitting handling of the utensil after retention therein, and the flexible utensil retaining device is capable of preventing contamination of contents of the vessel with contaminants on a surface of the utensil;
wherein the body portion comprises a top edge integral with the extension member at a center of the top edge;
wherein the extension member comprises an underside portion including a ridged surface to increase friction and prevent slippage from a grip of the vessel; and
wherein the flexible utensil retaining device is coated with a material that has a specific heat capacity greater than a specific heat capacity of stainless steel.

13. The flexible utensil retaining device of claim 12, wherein the body portion is capable of moldably and flexibly gripping a circumference of a handle portion of the utensil.

14. The flexible utensil retaining device of claim 13, wherein the body portion is capable of being used to retain a serving utensil, a cutlery item, a tool, or a medical instrument.

15. The flexible utensil retaining device of claim 12, wherein the extension member is flexible and extends outwardly from the body portion.

16. The flexible utensil retaining device of claim 12, wherein the one or more flexible wires of the extension member include a plurality of flexible wires internal to the extension member for molding the extension member to the contour of the edge of the vessel and the contour of the exterior surface of the vessel.

17. The flexible utensil retaining device of claim 12, further comprising a heat resistant material including one or more polymers, wherein each of the one or more polymers has a specific heat capacity.

18. The flexible utensil retaining device of claim 17, wherein the heat resistant material comprises one or more of: silicone, polyurethane, polyethylene, polystyrene, polyolefin, polyacrylate, polyester, polyamide, and polysulfone based polymers.

19. The flexible utensil retaining device of claim 12, wherein the body portion further comprises one or more filaments or wires for molding the body portion to a handle of the utensil.

* * * * *